United States Patent
Halevy

(10) Patent No.: US 10,933,995 B2
(45) Date of Patent: Mar. 2, 2021

(54) ROTATABLE RELEASE MECHANISM FOR TRANSPORTING AND RELEASING AN OBJECT

(71) Applicant: Eyal Halevy, Boynton Beach, FL (US)

(72) Inventor: Eyal Halevy, Boynton Beach, FL (US)

(73) Assignee: Eyal Halevy, Boynton Beach, FL (US)

( * ) Notice: Subject to any disclaimer, the term of this patent is extended or adjusted under 35 U.S.C. 154(b) by 688 days.

(21) Appl. No.: 15/804,301

(22) Filed: Nov. 6, 2017

(65) Prior Publication Data

US 2019/0135437 A1    May 9, 2019

(51) Int. Cl.
| | |
|---|---|
| *B64D 1/12* | (2006.01) |
| *B66C 1/34* | (2006.01) |
| *B66F 9/19* | (2006.01) |
| *B66C 1/10* | (2006.01) |
| *B64C 39/02* | (2006.01) |

(52) U.S. Cl.
CPC .............. *B64D 1/12* (2013.01); *B64C 39/024* (2013.01); *B66C 1/34* (2013.01); *B64C 2201/128* (2013.01); *B66C 1/10* (2013.01); *B66F 9/19* (2013.01)

(58) Field of Classification Search
CPC ........ B64D 1/12; B64D 17/383; B64D 17/38; B64C 2201/128; B66C 1/38
See application file for complete search history.

(56) References Cited

U.S. PATENT DOCUMENTS

| | | | | |
|---|---|---|---|---|
| 4,290,637 | A * | 9/1981 | Fischer | B64D 17/38 |
| | | | | 294/82.32 |
| 7,887,248 | B2 * | 2/2011 | Heath | F16C 11/06 |
| | | | | 403/345 |
| 9,174,733 | B1 * | 11/2015 | Burgess | B64D 1/12 |
| 9,688,404 | B1 * | 6/2017 | Buchmueller | B64D 1/12 |
| 10,315,764 | B2 * | 6/2019 | Shannon | B64D 1/12 |
| 2014/0217230 | A1 | 8/2014 | Helou, Jr. | |
| 2014/0254896 | A1 | 9/2014 | Zhou et al. | |
| 2015/0120126 | A1 | 4/2015 | So et al. | |
| 2015/0370251 | A1 | 12/2015 | Siegel et al. | |
| 2016/0033966 | A1 | 2/2016 | Farris et al. | |
| 2017/0011340 | A1 | 1/2017 | Gabbai | |

FOREIGN PATENT DOCUMENTS

| | | | |
|---|---|---|---|
| DE | 202014000236 U1 | 2/2014 | |
| DE | 202014002338 U1 | 5/2014 | |
| GB | 154663 A * | 12/1920 | ........... B64D 17/383 |
| WO | WO-2008118066 A1 * | 10/2008 | ............... B66C 1/38 |

OTHER PUBLICATIONS

English Translation—DE202014000236.
English Translation—DE202014002338.

* cited by examiner

*Primary Examiner* — Richard R. Green
(74) *Attorney, Agent, or Firm* — Zarley Law Firm, P.L.C.

(57) ABSTRACT

A rotatable release mechanism mounted to an output shaft of a servo/mechanical device and connected to a transport device. The mechanism has at least one wheel with at least one opening that is in communication with a slot that extends to an outer perimeter of the wheel. The opening receives and retains a connecting device during transport and releases the connecting device upon rotation of the release mechanism.

15 Claims, 7 Drawing Sheets

ROTATABLE RELEASE MECHANISM FOR TRANSPORTING AND RELEASING AN OBJECT

BACKGROUND OF THE INVENTION

This invention is directed to a rotatable release mechanism and more particularly a release mechanism for use with a transport device such as an unmanned air vehicle (UAV), an unmanned aircraft system (UAS), drone, quadcopter, flying apparatus, or the like.

Known in the art are devices, assemblies, and systems for transporting and then releasing an object. With the recent popularity of drones and the like finding ways to safely and easily transport objects has become desirable. Existing devices, while useful, are complex in their construction and operation. Attaching the object to a flying device can be difficult and time consuming. Also, during transport, should the object become caught or tangled there is no way to release the object which can cause damage to the flying device. Therefore, a need exists in the art for a mechanism that addresses these deficiencies.

An objective of the present invention is to provide a release mechanism that is easy to use and operate.

Another objective of the present invention is to provide a release mechanism where objects are easily attached and released.

A still further objective of the present invention is to provide a release mechanism that releases an object when it becomes trapped or tangled.

Another objective is to release and drop emergency items like life vest, food, water, wireless communication equipment and mobile phones, medical devices, medicine and others to persons in distress or during search and rescue operation.

Fishing is another objective in which the fishing line and fish bait are carried and released above School of fish.

Recreational use objective accommodates release and drop of recreational items like flowers, balloons, candies, confetti, toys, party favors, gliders, model aircraft, remote controlled model aircraft and more.

These and other objectives will become apparent to those skilled in the art based upon the following written description, drawings, and claims.

SUMMARY OF THE INVENTION

A rotatable release mechanism has at least one wheel connected to an output shaft of a servo/mechanical/electrical device. The wheel, while it can have any size, shape, and structure to accommodate multiple release scenarios, has at least one opening that is in communication with a slot that extends to an outer perimeter of the at least one wheel. The slot forms a finger on the wheel.

The servo/mechanical/electrical device is connected to a circuit board and a battery and all elements are disposed within a housing that is connected to a transport device. The rotatable release mechanism and the transport device are controlled by an activation control unit based upon at least one operating parameter detected by at least one sensor mounted to the rotatable release mechanism or the transport vehicle.

A connecting device is received within the opening of the at least one wheel for transport. The connecting device has a barrel swivel device and a release member. The release member preferably has a first magnet member and a second magnet member. To release the connecting member the wheel is rotated such that the connecting member slides from the opening along the finger in the slot until it exits the slot and is released.

DETAILED DESCRIPTION OF THE PREFERRED EMBODIMENT

Figure 1:
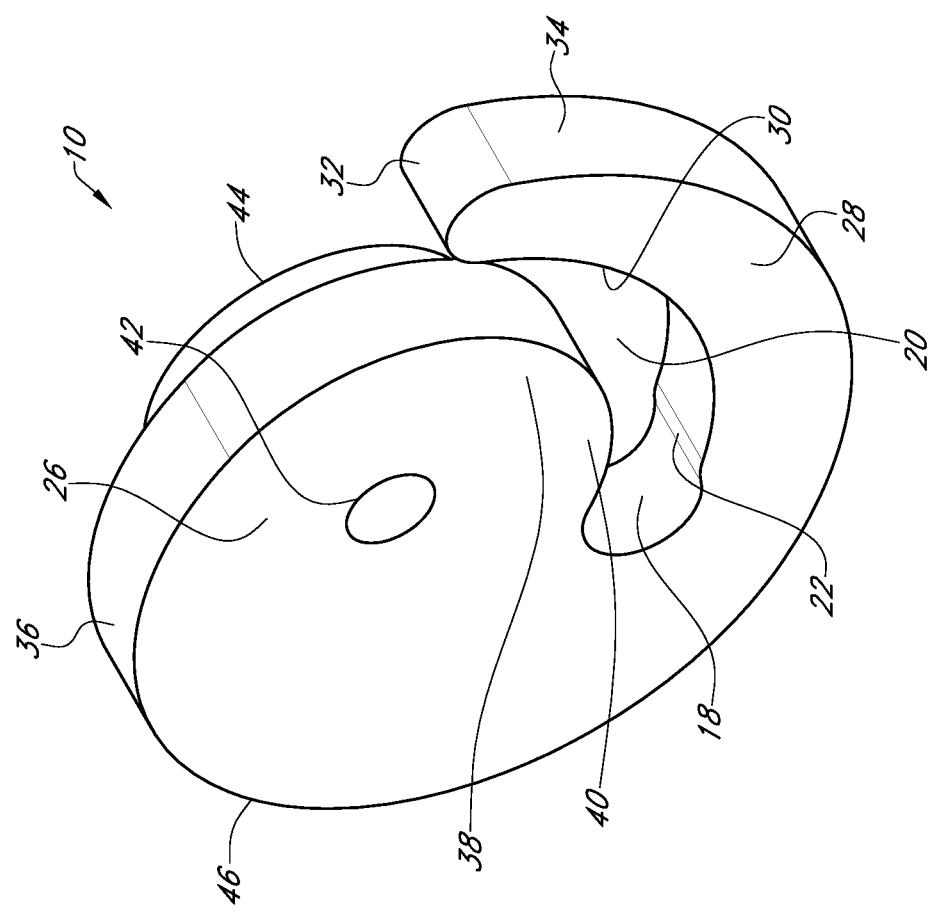
FIG. 1 is a perspective view of a rotatable release mechanism.
Figure 2:
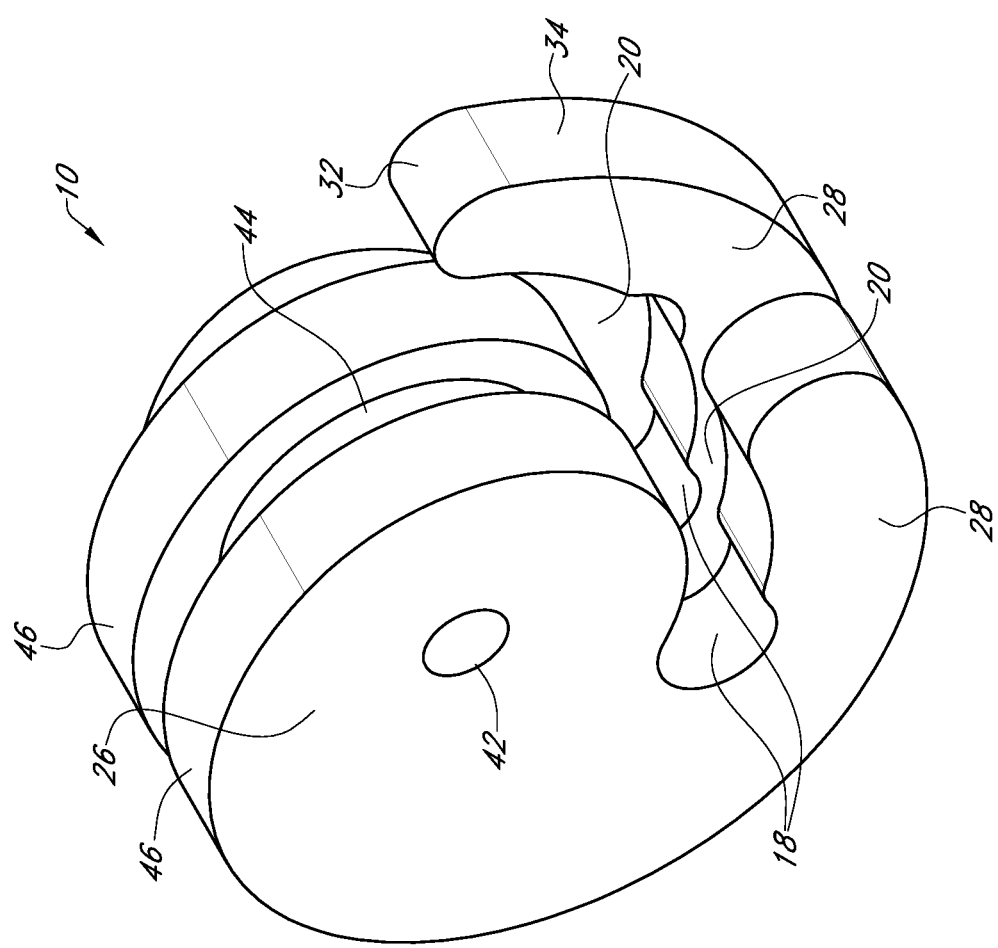
FIG. 2 is a perspective view of a rotatable release mechanism.
Figure 3:
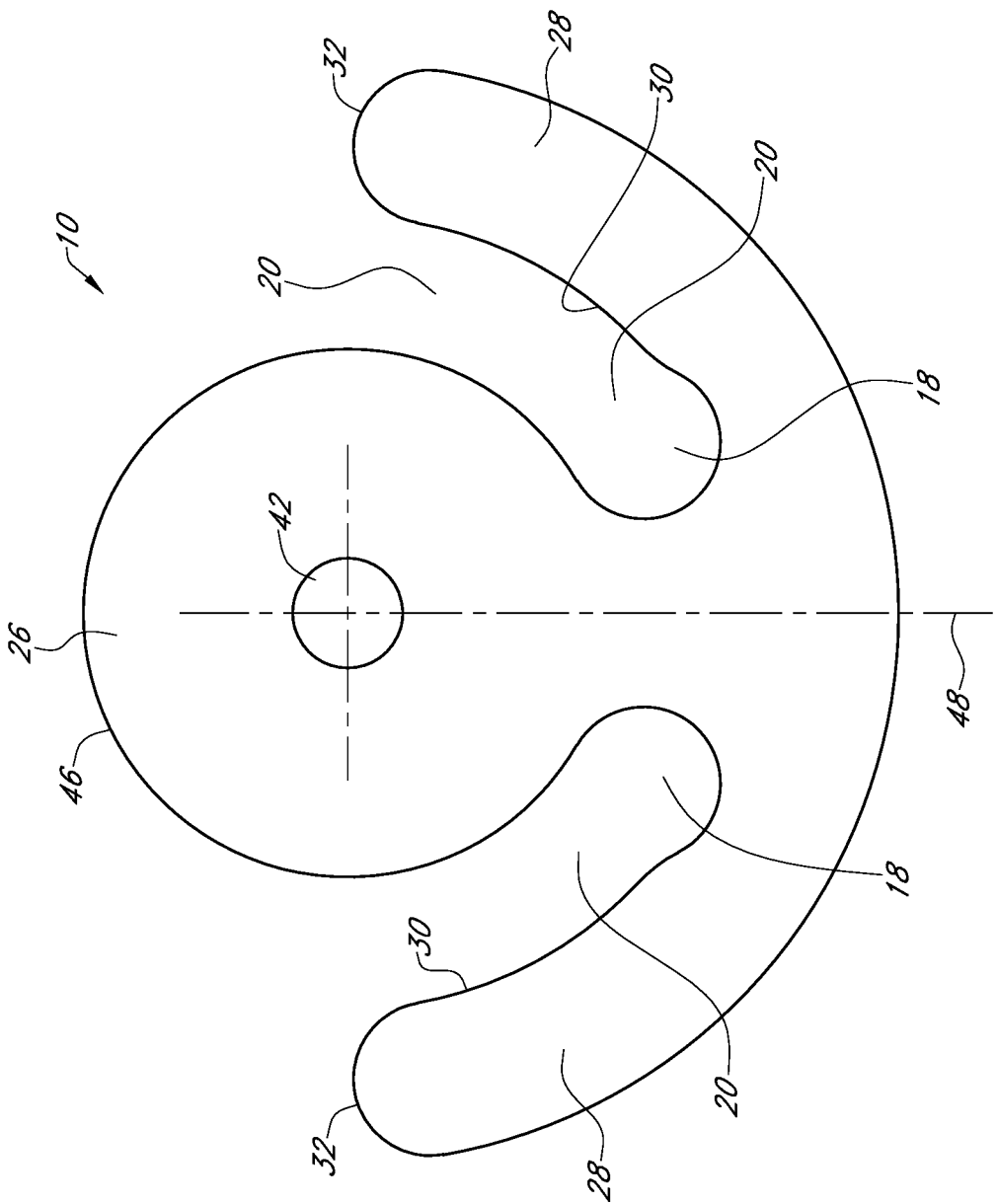
FIG. 3 is an end view of a rotatable release mechanism.
Figure 4:
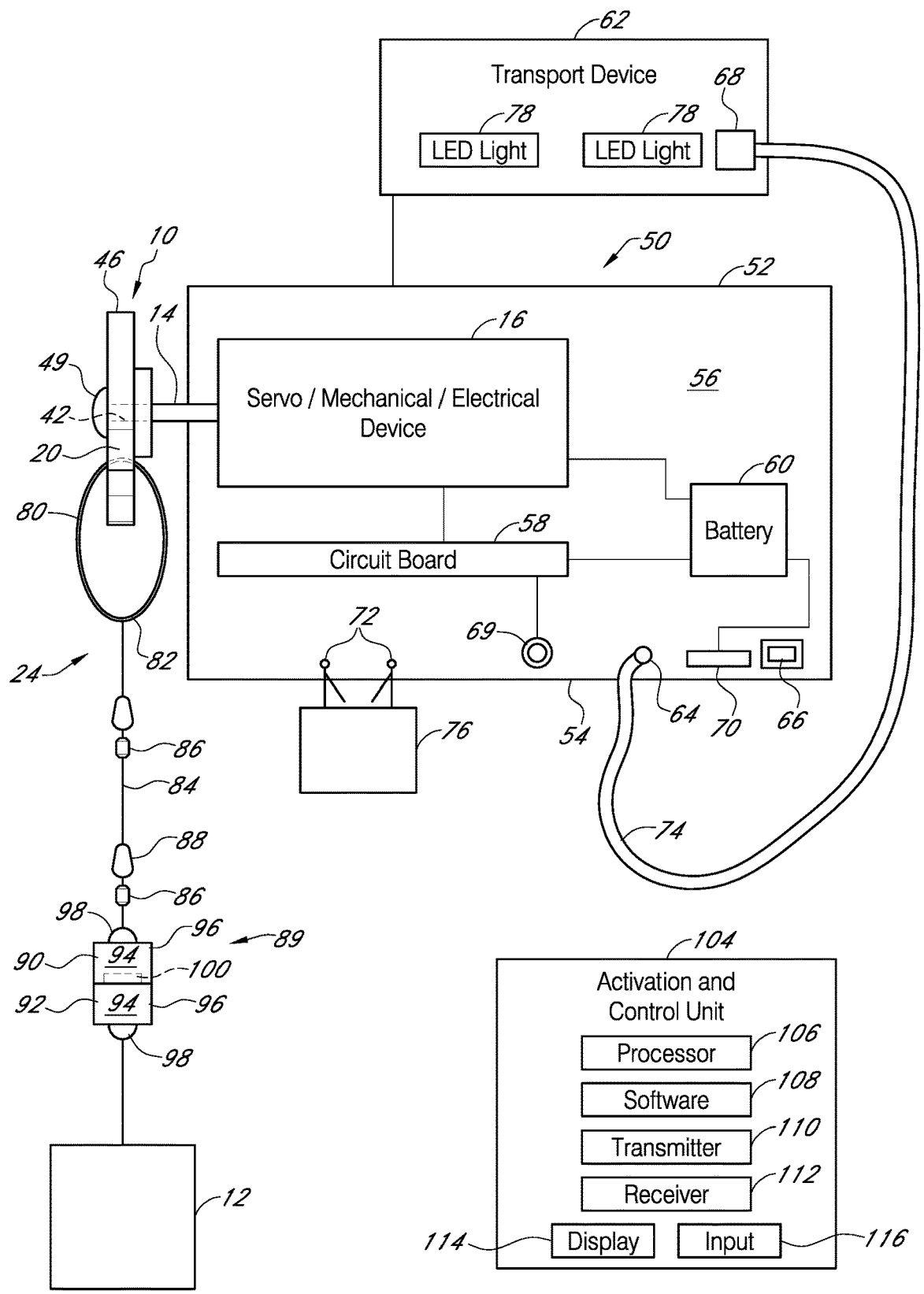
FIG. 4 is a schematic wheel of the environment for a rotatable release mechanism.
Figure 5:
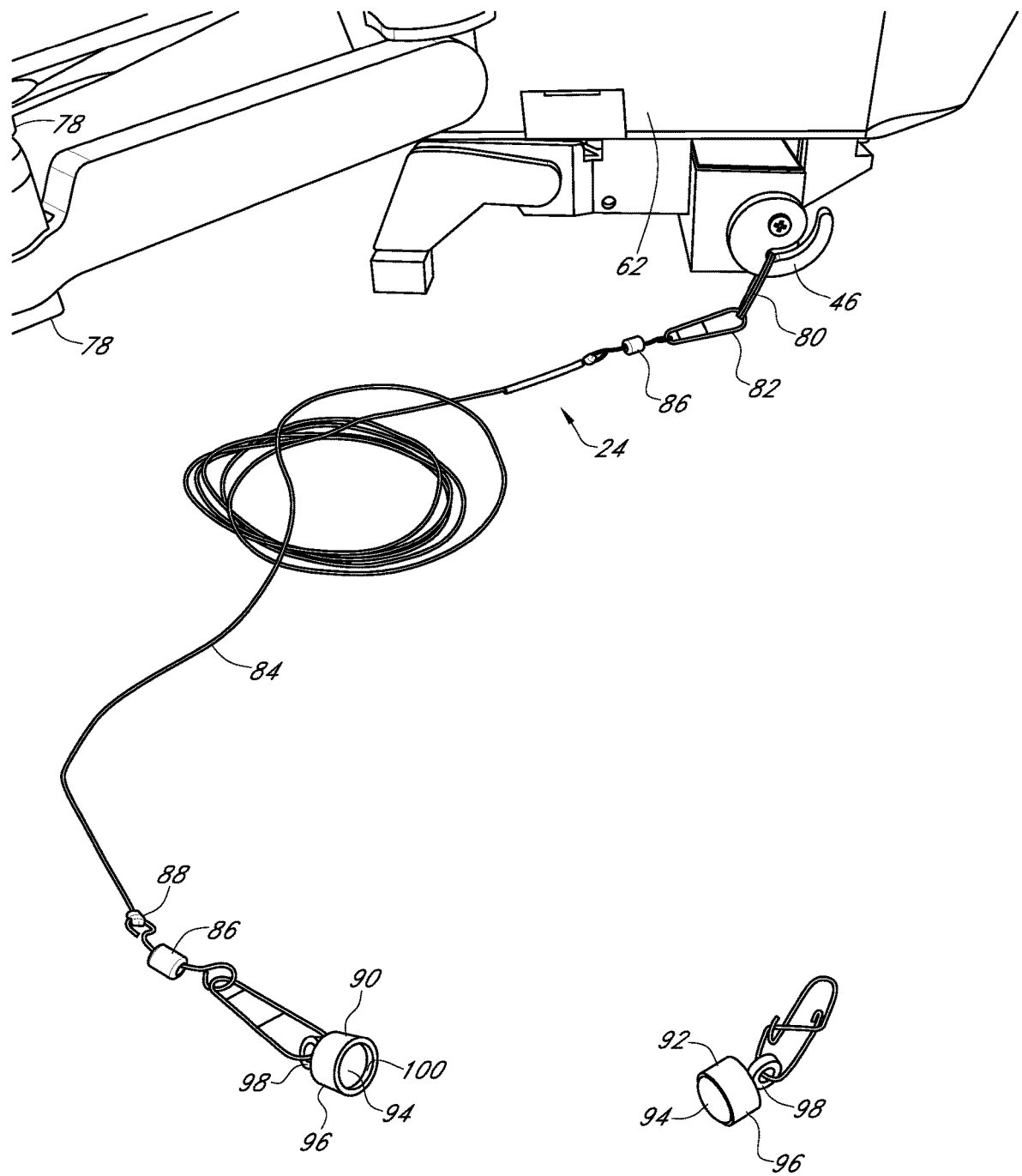
FIG. 5 is a perspective view of a connecting member for a rotatable release mechanism.
Figure 6:
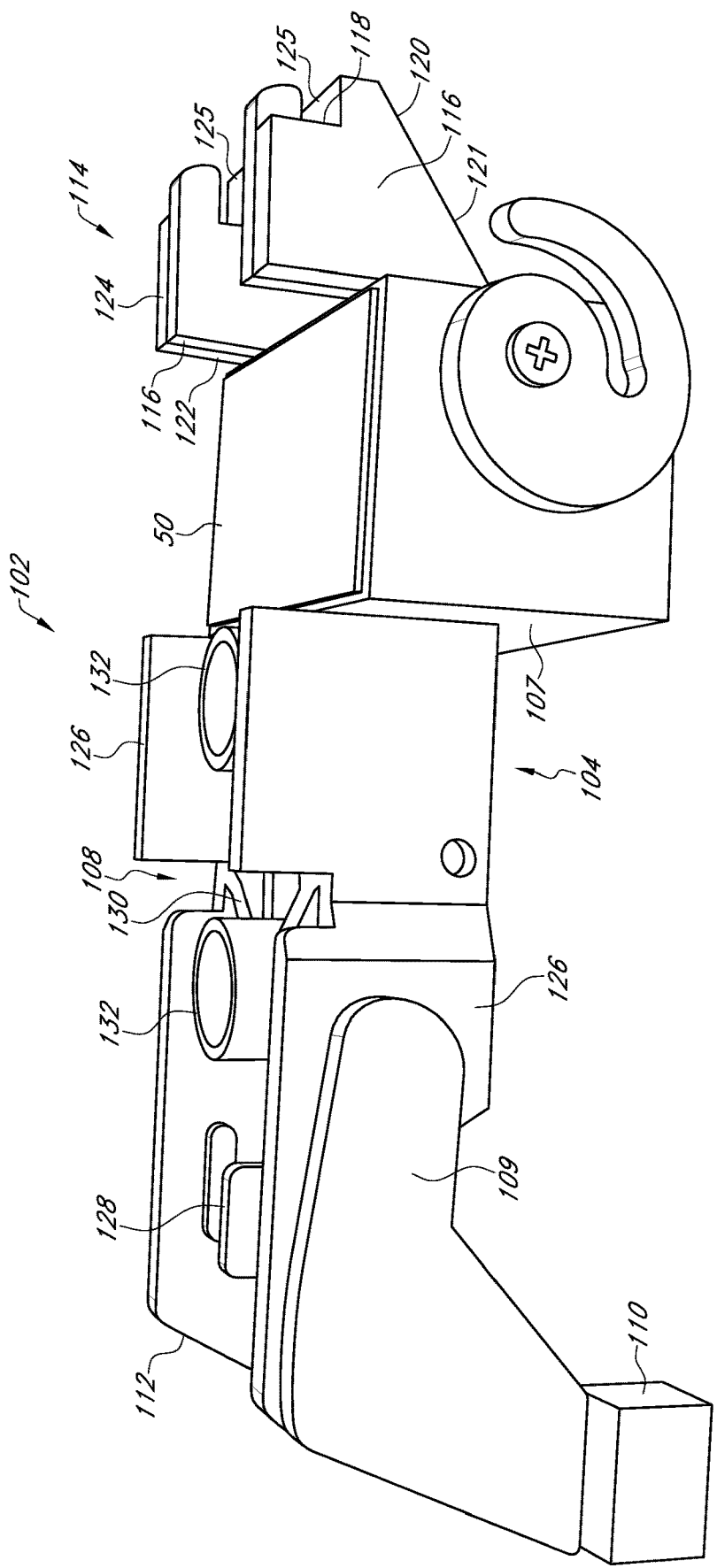
FIG. 6 is a perspective view of a quick mounting locking system.
Figure 7:
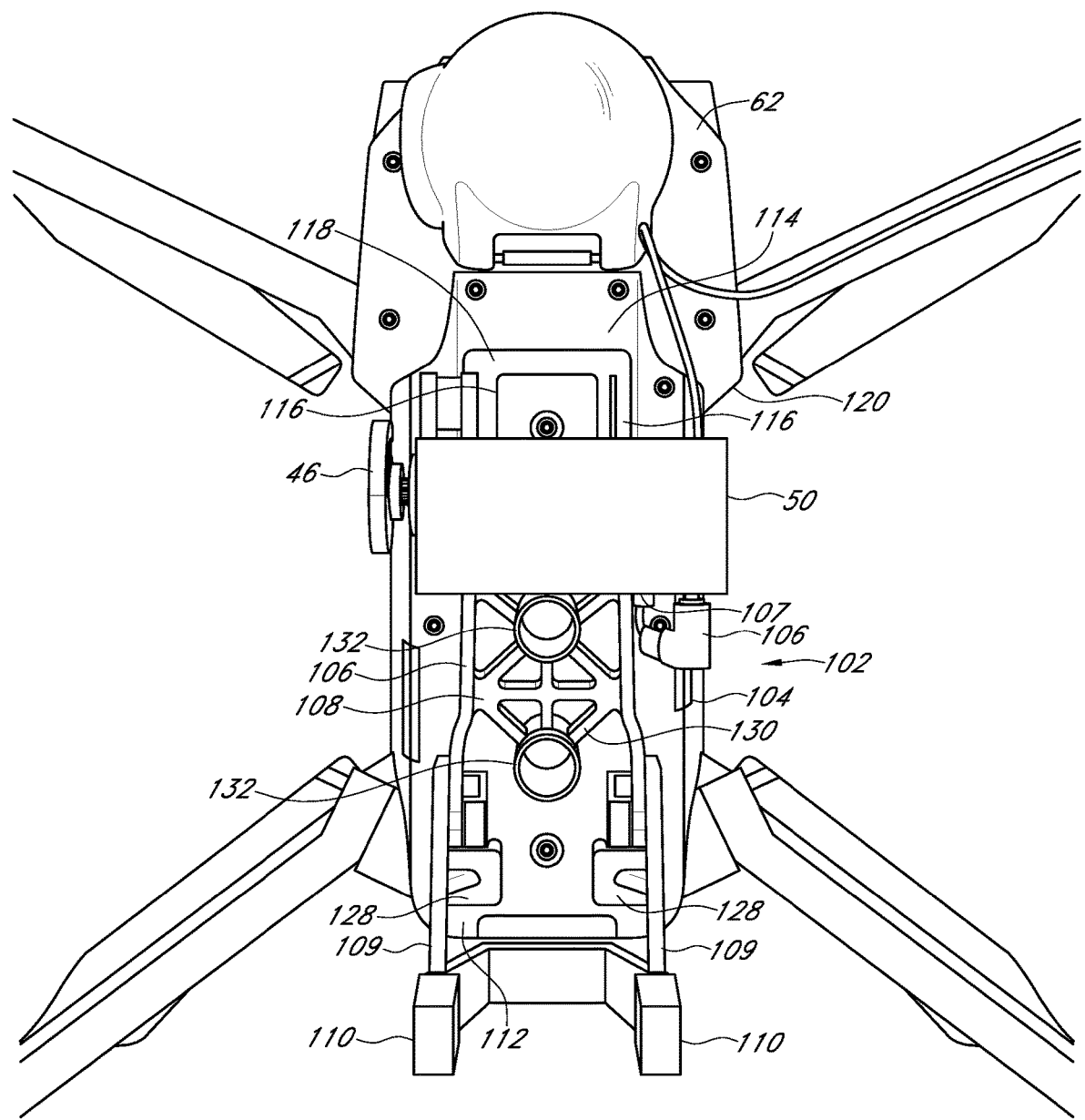
FIG. 7 is a bottom perspective view of a quick mounting release system that attaches to a transport device.

Referring to the Figures, a rotatable release mechanism 10 for transporting and releasing an object 12 is mounted to a rotatable output shaft 14 of a servo or mechanical or electrical device 16 such as a motor or the like. The rotatable release mechanism is of any size, shape, and structure. In one example shown, the rotatable release mechanism 10 has a partially circular opening 18 that terminates in an arcuate slot or groove 20. A part of the transition from the opening 18 to the slot 20 includes an edge or a catch 22 that assists in retaining a connection device 24 within the opening 18 during transport.

The slot 20 is defined by a circular portion 26 and a finger 28 of the rotating release mechanism 10. The finger 28 has an inner surface or edge 30 that extends from opening 18 to a tip 32 of the finger 28. The tip 32 of the finger 28 has an outer surface or edge 34 that terminates in an outer surface or edge 36 of the circular portion 26. The outer edge 36 continues around the circular portion 26 to the opening 18 wherein a portion 38 forms an inner edge 40 of slot 20. The circular portion 26 has an opening 42 that receives the output shaft 14 of the servo/mechanical/electrical device 16. A spacing plate 44 is also mounted to the circular portion 26 of the rotating release mechanism 10. A screw 49 is securing the rotatable release mechanism 10 via its center hole 42 to the rotatable output shaft 14 of a servo or mechanical or electrical device 16.

In a second example, the rotating release mechanism 10 has a pair of plates/wheels 46 connected as a single piece and having an opening 18, slot 20, circular portion 26, and finger 28 as previously described. Preferably, the wheels 46 are separated by a spacing plate 44, the openings 18 and slots 20 are aligned, and one finger 28 is longer than the other.

In a third example, a pair of openings 18, slots 20, and fingers 28 are included in a single wheel 46. Preferably, the openings 18, slots 20 and fingers 28 mirror one another and extend away from one another an equal distance from a central vertical axis 48 that extends through opening 42 of the circular portion 26.

The servo/mechanical/electrical device 16 preferably is disposed within a housing 50 having a top wall 52, a bottom wall 54, and side walls 56. Also disposed within the housing 50 is an electrical circuit board 58, and a battery 60 connected to the servo/mechanical/electrical device.

The housing 50 is mounted to a transport device 62. The transport device 62 is of any type that transports and releases an object such as a crane, forklift, vehicle, or flying apparatus. For purposes of example only without limiting the scope of the invention in any manner, the invention will be disclosed for use in relation to a flying apparatus such as an unmanned aerial vehicle (UAV), an unmanned aircraft system (UAS), a drone, a quadcopter, or the like.

The side walls 56 of the housing 50 have a cable port 64, a power switch 66, a charging USB port 70, activation pushbutton 69, and an electrical connector port 72. A cable 74 from the drone 62 is received within cable port 64, and an electrical connector 76 is received within port 72. Through the cable port 64, cable 74 is connected to the circuit board 58 and through port 72 connector 76 is connected to the electrical circuit 58. The other end of cable 74 has sensor 68 that is attached to the drone 62 Light Emitting Diodes lights 78.

Mounted on the circuit board 58 are plurality of sensors that sense operating parameters of the drone 62. Examples of the sensors include, but are not limited to, acceleration, 2-axis and/or 3-axis electronic or mechanical compass, magnetometer, magnetic field sensor, gyroscope, tilt angle, GPS, air pressor sensor, altitude sensor, lights, and camera.

The connection device 24 is of any size, shape, and structure. In a preferred example the connecting device 24 has a retaining member 80 such as a ring or the like that is slidably received within the opening 18 and the slot 20. The retaining member 80 is connected to a first end 82 of a cable or wire 84 by a barrel swivel assembly 86 that permits the cable 84 to rotate freely in relation to the retaining member 82. A second end 88 of the cable 84 is connected to a second barrel swivel assembly 86, which is connected to a release member 89.

The release member 89 is of any size, shape, and structure. In a preferred example, the release member 89 is comprised of a first and a second magnet member 90, 92. Both magnet members 90, 92 have a magnet 94 disposed within a housing 96. The first magnet member 90 has a loop 98 at one end connected to the second barrel swivel assembly 86 and a recess 100 at the opposite end. The second magnet member 92 has a loop 98 at one end and a portion of the magnet 94 extending out of the opposite end. The extending portion of the magnet 94 of the second magnet member 92 is sized and positioned to be received within the recess 100 of the first magnet member 90. The exposed sides of the two magnets 94 are attracted to each other due to their magnetic force and North pole/South pole polarization.

Connected to the loop 98 of the second magnet member 92 is an object 12 to be transported and released. The object 12 is of any type such as a life vest, float, communication devices (wired and wireless 2-way radios, cellular phone, mobile phone, etc.), GPS device, emergency beacon, emergency item, lights, flash lights, searchlight, projectors, LEDs, laser pointer, camera, thermal camera, infrared camera, speakers, amplified speakers, Bluetooth speakers, Bluetooth devices, megaphones, Wi-Fi devices, recording devices, parachutes, food items, water and other beverages, waterproof bags, clothing, flowers, balloons, water balloons, paint balloons, balls, baskets, boxes, containers, bags, candies, confetti, toys, party favors, medicine, medical devices, fishing equipment, hunting equipment, gliders, R/C gliders, model aircraft, R/C model aircraft, other drones and the like. The object 12 may also be disposed within a basket, box, container, or a bag sometimes having protective cushioning.

The operation of the rotating release mechanism 10 and the transport device 62 controlled by an activation and control unit 104 having a processor 106, software, 108, transmitter 110, receiver 112, display 114, and input devices 116. The operation is either automatically controlled based upon one or more operating parameters or selectably controlled by an operator.

Operating parameters are transmitted from the rotational release mechanism 10 and/or the transport device 62 using any type of signal. Examples include remote RF signals, light signals, laser signals, infrared signals, ultrasonic signal, Wi-Fi signals, Bluetooth signals, wireless signals, computer signals, data signals and/or signals via wire(s) or fiber-optic cable from the operator or another individual.

Operating parameters for controlling and operating the rotatable release mechanism 10 and/or transport device 62 include transport device acceleration, turning, spinning, rotating, tilting, yawing, ascending and/or descending in multiple directions including horizontal and vertical planes. For example, the number of accelerations, turns, spins, rotations, tilts, yaws, altitude changes and/or barometric air pressure changes of the transport device 62 are counted. Alternatively, the rotational release mechanism and/or transport vehicle 62 are controlled by sensing and/or counting the changes in the speed, yaw rate, direction of the turn, spin rotation, yaw, tilt angle, acceleration, altitude and/or barometric air pressure of the transport device 62. Alternatively, a transport device operator or other person can manually and remotely select multiple activation and control functions by sending commands to the drone 62, activating the drone 62 Light Emitting Diodes lights 78 or based on any of the above mentioned methods.

With respect to the actual release of an object, the function is dependent upon the specific wheel(s) 46 used, for example, when using a wheel 46 having a single slot 20 the servo/mechanical/electrical device 16 is activated by a signal from the activation control unit 104 that causes shaft 14 and in turn wheel 46 to rotate clockwise. As wheel 46 rotates the connection device 24, due to the weight of the load of the object and the gravity, slides from opening 18 along slot 20 until the connection device 24 falls out of slot 20.

With respect to the wheels 46 having two fingers 28 a connection device 24 is attached within the opening 18 of each wheel 46. Once activated, the wheels 46 rotate in a clockwise direction until the first connecting device 24 falls from the wheel 46 having the shortest finger 28. Further rotation of the wheel is required for the second connecting device 24 to fall from a longer finger 28.

Finally, with respect to the wheel 46 having multiple slots 20 that mirror one another, the servo/mechanical/electrical device 16 is selectively activated by controller 104 to cause shaft 14 and wheel 46 to rotate either clockwise, or counter clockwise, until the connecting member 24 falls from slots 20.

The release member 89 provides a fail-safe disconnect in case of over loading or when a load becomes tangled in wires, trees or the like. Specifically, by having a portion of magnet 94 extend into the recess 100 of the first magnet member 90, a stronger connection is created compared to two magnets that can slide in relation to one another. Accordingly, only when sufficient downward force occurs to overcome the magnetic force will the magnet members 90, 92 separate releasing a tangled or overloaded load.

In addition, devices mounted on the transport device may be activated and remotely controlled. Mounted devices include servos, lights, flashlights, searchlight, projectors, LEDs, laser pointer, cameras, thermal cameras, infrared cameras, wired and wireless communication devices, cellular phones, mobile phones, wireless phones, 2-way radios, GPS devices, speakers, amplified speakers, Bluetooth speakers, megaphones, Bluetooth devices, Wi-Fi devices, recording devices or any other devices by closing electric or electronic circuit via relay, contacts, electronic relay, solid state relay, MOSFET, transistor, disconnector or other means by communicating with the controlled item(s) and device(s).

The housing 50 is mounted to the transport device 62 using a quick mounting and locking system 102. The system 102 is of any size, shape, and structure. In a preferred example, the system 102 has a frame 104 that includes a pair of parallel spaced elongated members 106 connected to one another by a web 108. The elongated members 106 are connected to the housing 50 at a first end 107 and to a pair of legs 109 that are generally L-shaped and extend below the frame 104 to a pair of feet 110 at a second end 112. The legs 109 are pivotally mounted to the frame 104.

On the side of the housing opposite the connection to the elongated members 106 is a clip 114 that extends away from the housing 50. In a preferred example, the clip 114 has a pair of side members 116 that extend away from the housing 50 and are connected by a transverse wall 118 at an outer end 120. The pair of side members 116 have bottom edge 121 that tapers upwardly from the housing 50 toward the transverse wall 118. The side members 116 also extend above the housing to form a rear edge 122 and a top edge 124. The top edge 124 extends outwardly over the transverse wall 118 to form notches 125 between the top edge 124 and the transverse wall 118.

Adjacent the housing, the elongated members 106 have flanges 126 that extend upwardly and adjacent the second end 112 have flanges 128 that extend inwardly. The web 108 has a plurality of support members 130 connected to a pair of spaced hollow cylinders 132. The cylinders 132 are positioned to align with sensors on the transport device 62 to narrow and redirect the sensor beams to prevent false sensor activation from objects being transported.

The system 102 is attached to the transport device 62 with the notches 125, flanges 126 and flanges 128 receiving and/or engaging a portion of the transport device.

Accordingly a rotatable release mechanism for transporting and releasing an object has been disclosed that at the very least meets the stated objectives.

What is claimed is:

1. A rotatable release mechanism for transporting and releasing an object, comprising:
    a first wheel and a second wheel mounted to a rotatable output shaft of a motor with a spacing plate positioned between the first wheel and the second wheel;
    the first wheel and the second wheel each having at least one opening that terminates in an arcuate slot that defines a finger having an inner surface that extends from the opening to a tip; and
    the slot and the finger of the second wheel being longer than the slot and the finger of the first wheel.

2. The mechanism of claim 1 wherein the first wheel and the second wheel have a circular portion having an outer surface that extends from the opening and forms an inner edge of the slot and terminates in an outer surface of the finger.

3. The mechanism of claim 1 wherein the motor is connected to an electrical circuit board and a battery all of which are disposed within a housing.

4. The mechanism of claim 3 wherein a power light connected to the circuit board indicates a remaining battery capacity with a series of blinks.

5. The mechanism of claim 3 wherein the housing connects a lock to the transport device using a quick mounting and locking system.

6. The mechanism of claim 1 mounted to a transport device.

7. The mechanism of claim 1 having a connection device removably attached to the first wheel.

8. The mechanism of claim 7 wherein the connection device has a barrel swivel assembly.

9. The mechanism of claim 7 wherein the connection device has a release member.

10. The mechanism of claim 9 wherein the release member has a first and a second magnet member.

11. The mechanism of claim 1 activated and controlled by an activation and control unit.

12. The mechanism of claim 11 wherein the operation of the motor is controlled based upon at least one operating parameter detected by at least one sensor.

13. The mechanism of claim 12 wherein the activation and control unit activates and controls devices mounted on the transport device.

14. The mechanism of claim 13 wherein the devices mounted on the transport device are controlled and operated by the activation and control unit based upon at least one other operating parameter detected by at least one other sensor.

15. The mechanism of claim 1 wherein the first wheel is positioned at an end of the rotatable output shaft.

* * * * *